United States Patent [19]
Martin, Jr.

[11] 3,796,247
[45] Mar. 12, 1974

[54] PNEUMATIC TIRE
[75] Inventor: Kirby B. Martin, Jr., Cuyahoga Falls, Ohio
[73] Assignee: The B. F. Goodrich Company, New York, N.Y.
[22] Filed: June 16, 1970
[21] Appl. No.: 46,633

[52] U.S. Cl. .............................. 152/361, 152/354
[51] Int. Cl. ............................................. B60c 9/20
[58] Field of Search ............ 152/361, 354, 359, 330

[56] References Cited
UNITED STATES PATENTS
| | | | |
|---|---|---|---|
| 3,299,935 | 1/1967 | Bush | 152/361 |
| 3,513,898 | 5/1970 | Lugli et al. | 152/361 |
| 3,540,511 | 11/1970 | Mirtain | 152/361 |
| 1,842,353 | 1/1932 | Lorentz | 152/361 |
| 3,515,197 | 6/1970 | Boileau | 152/361 |
| 2,541,506 | 2/1951 | Cuthbertson et al. | 152/361 |
| 3,467,161 | 9/1969 | Menell et al. | 152/354 |

Primary Examiner—Drayton E. Hoffman
Attorney, Agent, or Firm—W. A. Shira, Jr.

[57] ABSTRACT

A tire of vulcanized elastomer having at least two carcass plies having reinforcing cords embedded therein with the cords in each ply extending continuously at a bias angle from one bead to the opposite bead of the tire. An overhead ply having metal reinforcing wires therein is provided over the carcass ply, with the wires in the overhead ply spliced in the crown region of the tire and extending at equal but opposite bias angles on axially opposite sides of the tire through the sidewalls and terminating adjacent the beads.

6 Claims, 2 Drawing Figures

PATENTED MAR 12 1974 3,796,247

PNEUMATIC TIRE

BACKGROUND OF THE INVENTION

In designing and manufacturing tires for off-the-road use under severe service, such as is encountered in logging operations on vehicles of the type known as skidders used to drag or skid logs over the surface of the ground, it has been found quite difficult to provide a tire which would withstand the power traction loads and penetration by contact with logs and rocks and other objects encountered by the vehicle. In service applications such as logging skidders, the speed of the vehicle is generally slow when compared to that of conventional passenger cars but the terrain traversed is much more severe and thus a tire is required which has sufficient reinforcement therein to protect the carcass from puncturing in the tread and sidewall region.

Heretofore, attempts have been made to provide tires for the above type of severe service which incorporated at least one ply of elastomer with steel wire reinforcement closely spaced beneath the tread. However, the incorporation of a bias angle wire reinforced ply beneath the tread in the form of a belt over the carcass plies, has resulted in the movement or shifting of the wire cords in the belt ply into the traction lugs of the tread during the molding operation. This occurs in those regions where the wire reinforcing cords are substantially parallel to the traction lugs and thus proper disposition of the wire cords in the vulcanized tire is not maintained during the vulcanizing operation. Therefore, it has been desirable to find some way in which the tire carcass can be reinforced with wire cord beneath the tread and provide for proper disposition of the cords in a manner preventing movement of the cords during molding. The problem is particularly acute with tires of the type having an oblique traction lug pattern where the lugs on opposite axial sides of a tire make equal but opposite angles with the midplane of rotation of the tire.

SUMMARY OF THE PRESENT INVENTION

The present invention provides a solution to the above-described problem of reinforcing the tread region and sidewalls of an off-the-road tire by incorporating a ply or layer of wire reinforced elastomer beneath the tread and extending into the sidewall region in a manner which enables the tire to be molded by conventional techniques and yet maintains the proper positioning of the wire cords in the tread region during shaping and molding.

The present tire has multiple plies of elastomeric material having therein textile reinforcing cords disposed at a bias angle to the plane of rotation of the tire, which plies are surmounted by a final or overhead ply of wire reinforced elastomer with the overhead ply extending through the sidewalls of the tire and terminating adjacent the beads of the tire. The wire reinforced overhead has each of the individual cords therein terminating at the center of the crown region of the tire and making equal but opposite angles with the rotational midplane of the tire on axially opposite sides thereof.

The wire cords in the belt or overhead are disposed substantially perpendicular to the corresponding radially adjacent traction lugs of the completed tire.

DETAILED DESCRIPTION

Figures 1, 2:
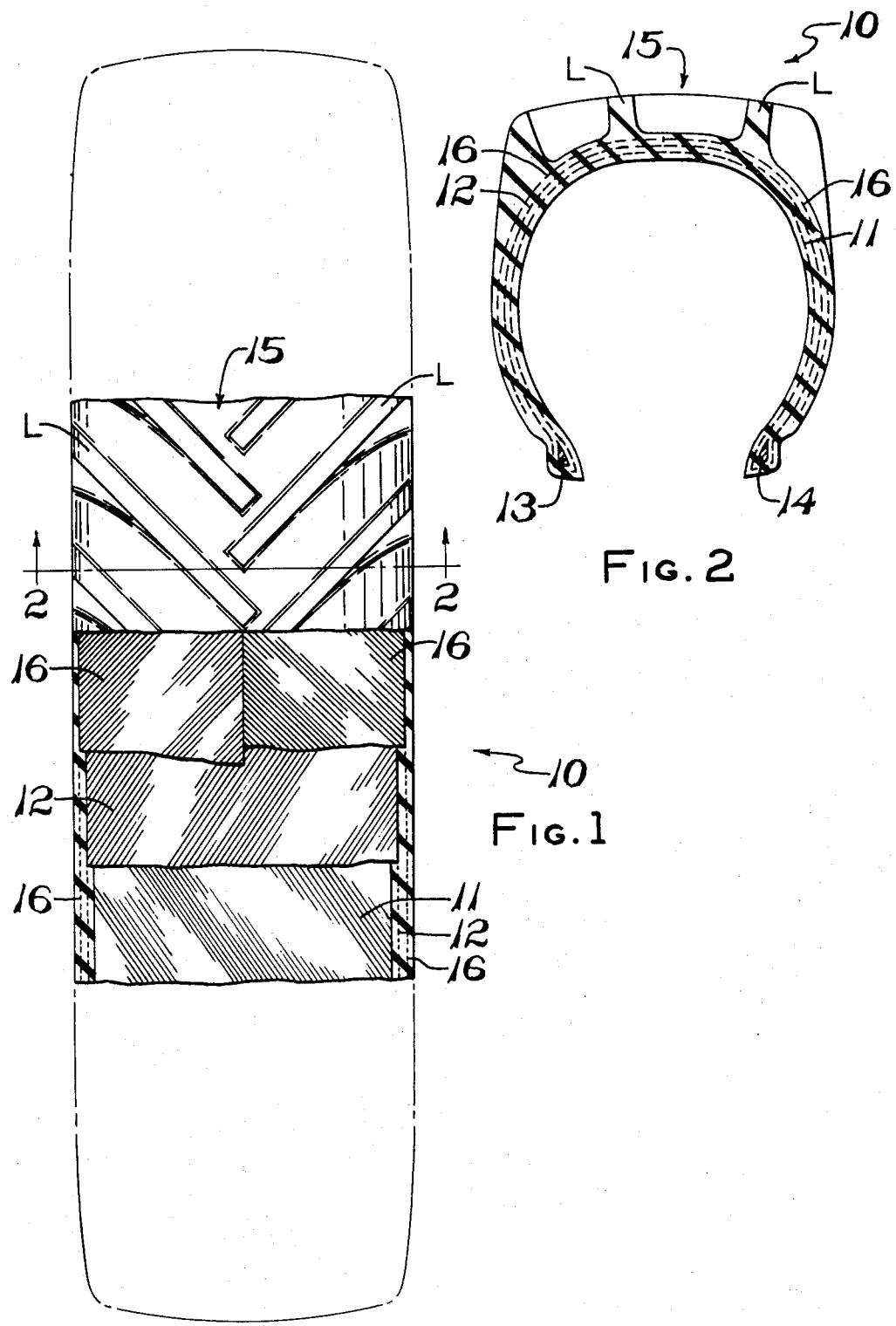
FIG. 1 is an edge view of a portion of the tire of the preferred embodiment of the invention with portions of the tread region broken away to expose the carcass plies beneath.
FIG. 2 is a fragmentary section view taken along section indicating lines 2—2 of FIG. 1 which shows the ply arrangement of the tire carcass.

Referring now to FIGS. 1 and 2, the tire 10 is formed with at least two plies 11 and 12 of textile cord reinforced elastomer extending throughout the carcass of the tire with each ply turned axially over respectively one of a pair of spaced beads 13 and 14 thus forming the sidewall, beads and the crown region of the tire. A traction increasing tread portion 15 is provided in annularly superposed arrangement over the crown region of the tire, the tread having individual traction lugs L formed integrally therein with the lugs L disposed in a broken or staggered "herring bone" pattern making alternating opposite acute angles with the rotational midplane of the tire on axially opposite sides thereof. In the presently preferred form, as shown in FIGS. 1 and 2, an overhead ply 16 is provided in annularly superposed arrangement over the carcass plies 11 and 12, with the overhead ply 16 having metal wire reinforcing cords therein. The wire cords in the overhead ply 16 extend from the region closely adjacent one bead 13 radially outwardly through one sidewall and crown region and through the opposite sidewall of the tire to terminate adjacent the opposite bead 14. In the preferred practice of the invention, the wire cords in the overhead ply 16 terminate in the range of from 1–2 inches from the beads 13 and 14 of the tire. However, it should be noted that the distance from the beads at which the overhead ply wire cords terminate is determined by desired amount of reinforcement to be provided for the sidewall regions of the tire. The wire cords in the overhead ply 16 may terminate any distance in the range of from 1–5 inches from the beads depending upon the size of the tire and the desired amount of reinforcement.

Referring now specifically to Fig. 1, the wire cords in the ply 16 extend in two portions at equal and opposite angles from the beads 13 and 14 radially outwardly to the center of the crown region of the tire, or the rotational midplane, at which location the adjacent ends of the wire cords in two portions of the ply 16 are butt-spliced. The presently preferred practice of the invention the angle of the wire cords in the carcass plies 11 and 12 is in the range 30°–45° and the overhead ply cords are within the range of −5° to +10° of parallelness with the cords in the carcass plies 11 and 12. Furthermore, the cords in the overhead ply 16 are disposed so as to be within 15° of perpendicularity with the traction lugs L.

In the embodiment of the invention illustrated in FIGS. 1 and 2, only two carcass plies 11 and 12 have been shown for simplicity of illustration and for clarity in illustrating the overhead reinforcing ply 16. In the presently preferred practice of the invention, more than two carcass plies 11 and 12 may be employed depending on the desired carcass strength of the tire; however, only two plies have been illustrated for simplicity. Only one belt reinforcing ply 16 having metal wire cords therein is employed in the presently preferred practice. Where greater carcass strength is desired, additional carcass plies are added rather than additional overhead plies in order to minimize carcass flex stiffness for any given amount of reinforcement. The wire cords are preferably each formed of a plurality of monofilaments of steel twisted together to form a wire cord having a diameter in the range of .020 to .100 inches and preferably spaced in the range of from 8 – 35 cords per inch of ply material. It will be understood that various combinations within the foregoing ranges of sizes of wire reinforcing cord and variations of spacing of the cords within the ply material may be made as will be understood by those having ordinary skill in the art.

The present invention thus provides a tire for heavy-duty off-the-road service having multiple plies of carcass reinforcement therein and further having a ply of elastomer with metal wire reinforcement disposed in overhead ply, superposed over the carcass plies and beneath the tread. The wire cords in the overhead ply are individually terminated in the crown region of the tire making equal but opposite angles with the rotational midplane of the tire on axially opposite sides thereof with the wire reinforcing cords extending from the crown region through the sidewalls and terminating closely adjacent the beads of the tire.

Modifications and adaptations of the invention may be made by those having ordinary skill in the art and the invention is limited only by the spirit and scope of the following claims.

I claim:

1. A pneumatic tire having a carcass of textile cord reinforced elastomer and a pair of sidewalls terminating in axially spaced beads with the crown region thereof surmounted by a tread of elastomeric material, the said tire comprising:
   a. at least two plies of said cord reinforced elastomer disposed in annularly superposed arrangement with the cords in each ply interconnecting the beads and extending through the crown region at an acute angle to the plane of rotation; and,
   b. at least one overhead ply of elastomer annularly superposed over said carcass plies having wire reinforcing cords therein, the said wire cords extending through the sidewalls of the tire and terminating axially closely adjacent the beads and radially outwardly therefrom with the said wire cords in each overhead ply on opposite sides of the axial midplane making equal but opposite acute angles therewith and each of said wire cords is discontinuous at the axial midplane of the tire.

2. The tire defined in claim 1, wherein the said wire cords are formed of a plurality of metal filaments twisted together.

3. The tire defined in claim 2, wherein each of said cords has a diameter in the range 0.020 – 0.100 inches and said cords are spaced so as to provide 8 – 35 cords per inch of ply material.

4. The tire defined in claim 1, wherein the said wire cords are aligned to within −5° to +10° of parallel with the cords in alternate carcass plies.

5. The tire defined in claim 1, wherein the said wire cords extend to within 1 – 5 inches of the beads.

6. The tire defined in claim 1 having a lug tread with the cords in said overhead ply making an angle of within 15° of perpendicularity with the length of said lugs.

* * * * *